United States Patent [19]

Jang et al.

[11] Patent Number: 5,484,627
[45] Date of Patent: Jan. 16, 1996

[54] METHOD FOR MANUFACTURING LIQUID CRYSTAL DISPLAY DEVICE

[75] Inventors: In-sik Jang; Nobuyuki Yamamura, both of Suwon, Rep. of Korea

[73] Assignee: Samsung Electronics Co., Ltd., Suwon, Rep. of Korea

[21] Appl. No.: 111,063

[22] Filed: Aug. 24, 1993

Related U.S. Application Data

[63] Continuation-in-part of Ser. No. 58,712, May 10, 1993.

[30] Foreign Application Priority Data

Aug. 24, 1992 [KR] Rep. of Korea ................ 15193/92

[51] Int. Cl.⁶ ........................................... B05D 5/12
[52] U.S. Cl. .......................... 427/58; 427/162; 427/240; 427/407.1; 427/428; 427/384

[58] Field of Search ............... 427/58, 407.1, 427/384, 162, 240, 428

[56] References Cited

U.S. PATENT DOCUMENTS

| | | | |
|---|---|---|---|
| 3,977,767 | 8/1976 | Okuma | 252/299.67 |
| 4,925,705 | 5/1990 | Waters et al. | 427/466 |
| 5,101,011 | 3/1992 | Mikami | 252/299.01 |
| 5,319,479 | 6/1994 | Yamada et al. | 427/578 |

Primary Examiner—Shrive Beck
Assistant Examiner—Brian K. Talbot
Attorney, Agent, or Firm—Cushman Darby & Cushman

[57] ABSTRACT

A method of obtaining a multi-level liquid crystal device repeatedly applies a sublimation material layer and then an insulating layer. Thereafter, the sublimation material layer is removed via heating, escaping through holes placed in the layered structure, leaving empty layered spaces into which liquid crystal can be filled.

13 Claims, 9 Drawing Sheets

METHOD FOR MANUFACTURING LIQUID CRYSTAL DISPLAY DEVICE

This application is a continuation-in-part of application Ser. No. 08/058,712. filed May 10, 1993.

BACKGROUND OF THE INVENTION

The present invention relates to a method for manufacturing a liquid crystal display device which is used in an optical display, and more particularly to a method for forming an insulation layer to partition liquid crystal layers in a liquid crystal display having a multi-layer liquid crystal structure.

Currently utilized liquid crystal display devices, of an active matrix type use a simple X-Y matrix or thin film transistor (TFT) driving method both driving methods use a twisted nematic (TN) type or super twisted nematic (STN) type liquid crystal and a polarizing plate for controlling light. However, the polarizing plate in the liquid crystal display (LCD) intercepts more than 50% of the light. Accordingly, efficiency is lowered. For this reason, a background light source having a considerable intensity is required to obtain a picture image having a desired brightness. Thus, in a laptop word processors or computers which use a dry cell battery or an accumulative battery cell as a power supply source extended use is limited due to the excessive power consumption of the light source.

Also, in known LCDs, including the TN and STN LCD devices, since the liquid crystal is charged between two glass plates, a cell gap must be made within stringent range requirements to form a uniform picture image. Therefore, due to current technological limitations in the manufacturing of glass plates, enlarging LCD panels is hard to achieve.

Taking the above-described problems into consideration, in order to decrease the need for very precise cell gap adjustment, it has been known to eliminate the polarized plate to increase efficiency and instead use a single sheet of a base plate. Examples of LCD without a polarized plate include a cholesteric nematic transition (CNT) type which uses a phase transition effect and a dynamic scattering mode (DSM) type which was devised early in LCD development. The DSM type LCD exhibits slow response time and cannot be made thin. For those reasons it is no longer in common use.

Another example of an LCD not using a polarized plate to increase the efficiency of light is a polymer-dispersed liquid crystal display (PDLCD). However, since the PDLCD is made of a polymer material, more than half of whose volume is light-transmitting, the scattering of light is needed to obtain a clear contrast ratio. To attain these requirements, there is structural limitation that the thickness of the liquid crystal layer should be at least 20 m.

An LCD which adopts an electrical field effect type liquid crystal having a new structure, in which the above conventional LCD problems are considerably improved, if the parent application to this continuation-in-part application, which bears U.S. patent application Ser. No. 08/058,712, was filed on May 10, 1993, and is expressly incorporated by reference herein.

Figure 1:
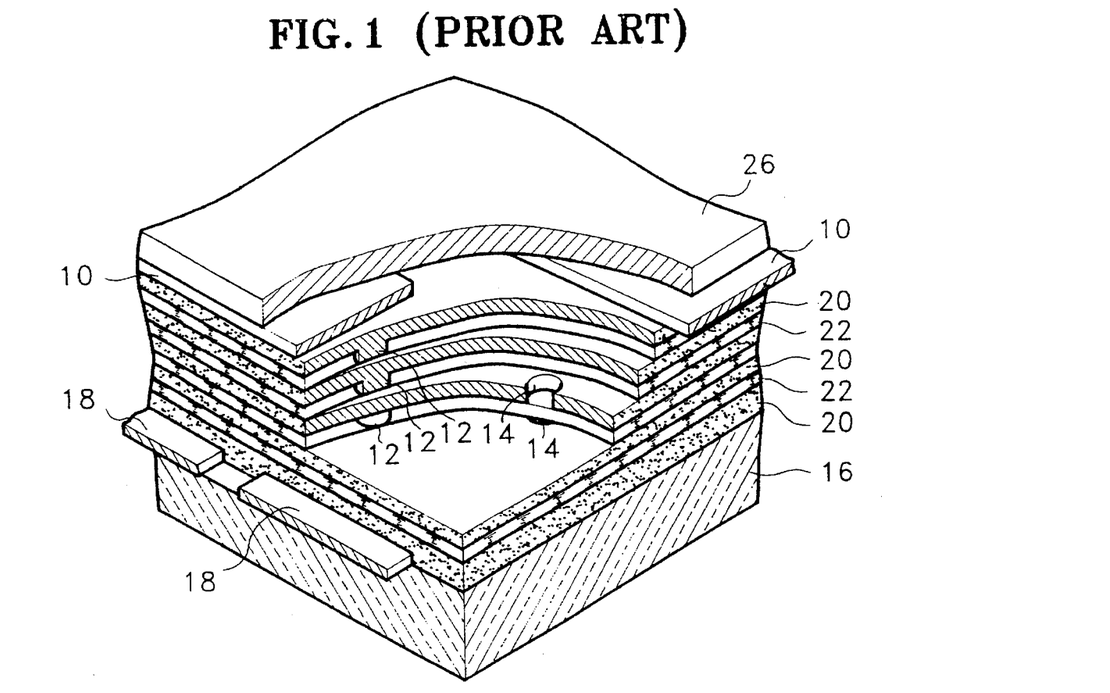
FIG. 1 is a schematically partly exploded perspective view of the reflective type LCD disclosed in the parent application.

The LCD described the parent application Ser. No. 08/058,712 has a fast driving speed and a high light-utilization efficiency. Liquid crystal layer provided between the opposing electrodes is isolated by a plurality of insulation layers to form a multi-layer structure. A polarized plate is not used and only a single sheet of a glass substrate is applied. As shown in FIG. 1, liquid crystal layers 20 of the electrical field effect type are provided between opposing electrodes 10 and 18. The thickness of each liquid crystal layers 20 is maintained by the columns 12. Insulation layers 22 for separating each liquid crystal layer 20 are provided between adjacent liquid crystal layers 20. The mutual location of insulation layers 22 is fixed by columns 12 which are provided locally. Injection holes 14 for locally injecting the liquid crystal are provided on one side of the insulation layer 22. Here, the thickness of each liquid crystal layer is less than or equal to 3 m. The thickness of each layer of the insulation layer is preferably less than or equal to 5 m. The insulation layer 22 can be made of an epoxy resin material, or a metal oxide, particularly an aluminum oxide.

Figure 2:
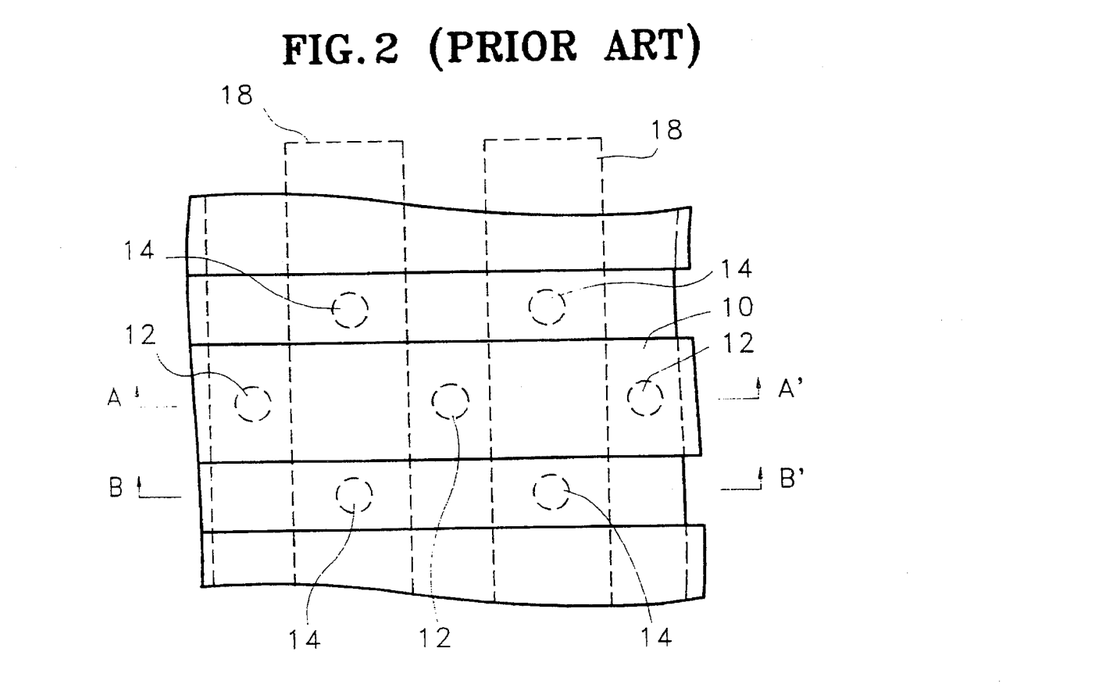
FIG. 2 is a partial plan view of the LCD of FIG. 1.
Figure 3:
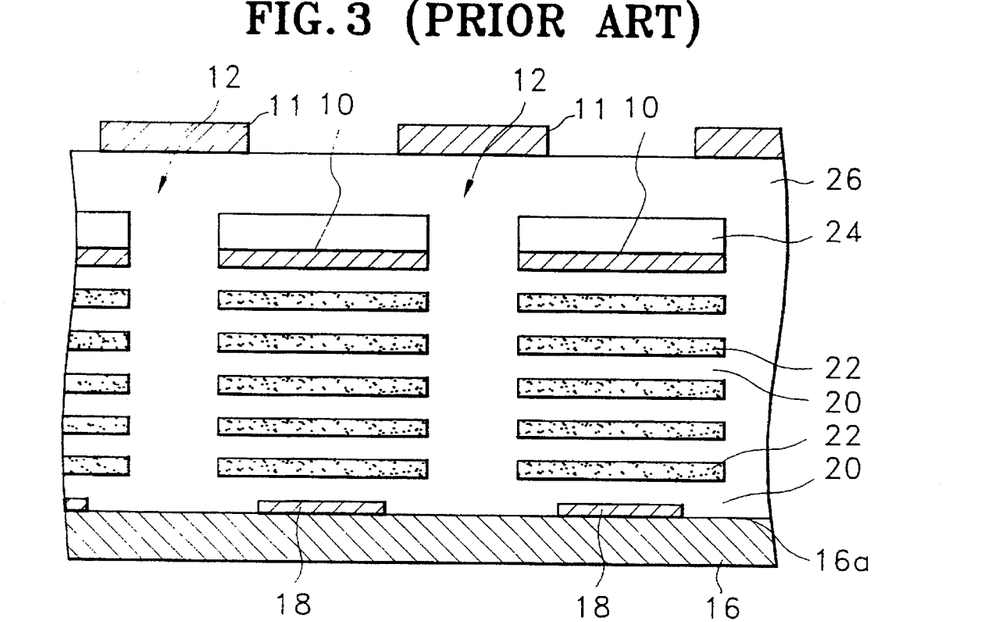
FIG. 3 is a cross-sectional view along a line A–A' of the LCD of FIG. 2.
Figure 4:
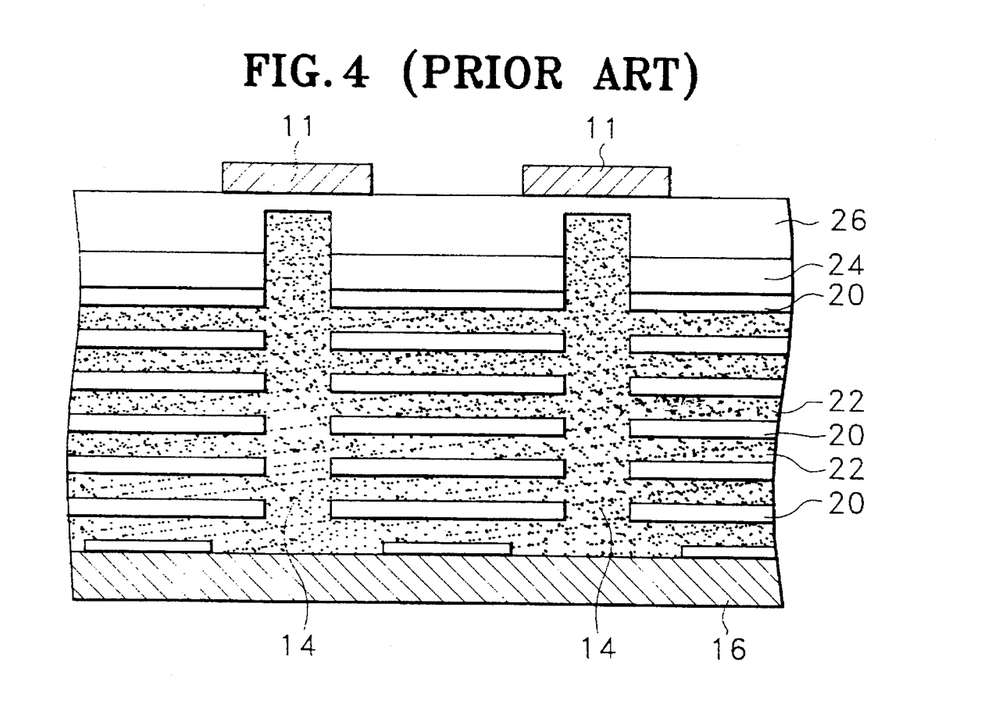
FIG. 4 is a cross-sectional view along a line B–B' of the reflective type LCD of FIG. 2.

FIG. 2 illustrates a top view of LCD, and, in particular, the arrangement of column 12 and injection holes 14 in relation to an electrode 10. FIGS. 3 and 4, illustrate the A—A and B—B cross sectional views of this LCD, respectively.

The manufacturing sequence of the above described reflective-type LCD by the above method will be described with reference to FIG. 5–10.

Figure 5:
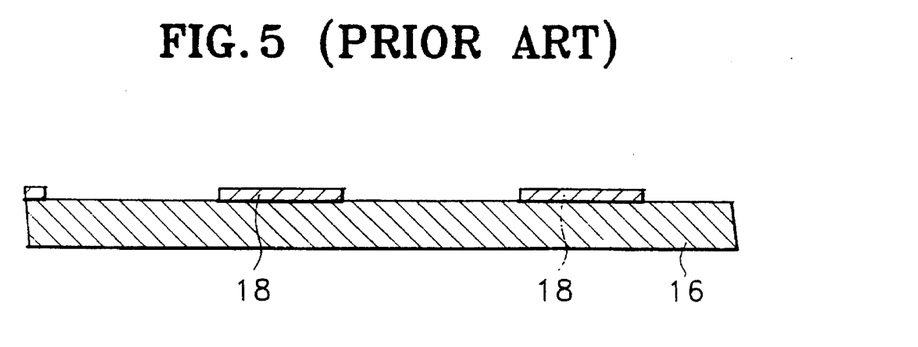
FIGS. 5, 6, 7, 8, 9, 10 are views illustrating the manufacturing steps of the reflective type LCD of FIG. 1.

In FIG.5, an electrode 18 of a predetermined pattern is formed of a conductive material on black plastic substrate 16.

Figure 6:
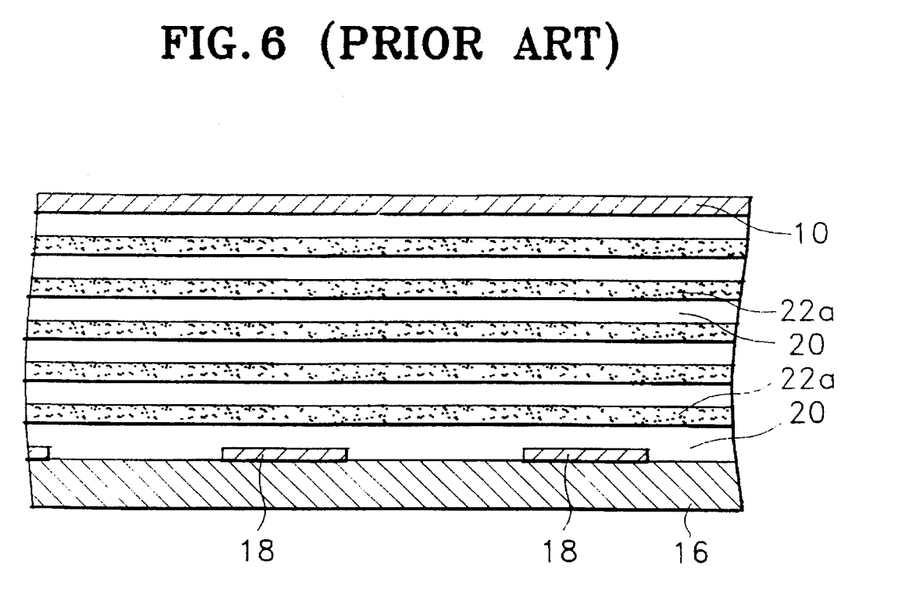

In FIG. 6, epoxy resin layer 20 and PVA layer 22a are alternately laminated a number of times on electrode 18 of FIG. 5, by a spin coating or roll coating method. Then, an upper electrode 10 is formed of indium tin oxide (ITO) on epoxy resin layer 20.

Figure 7:
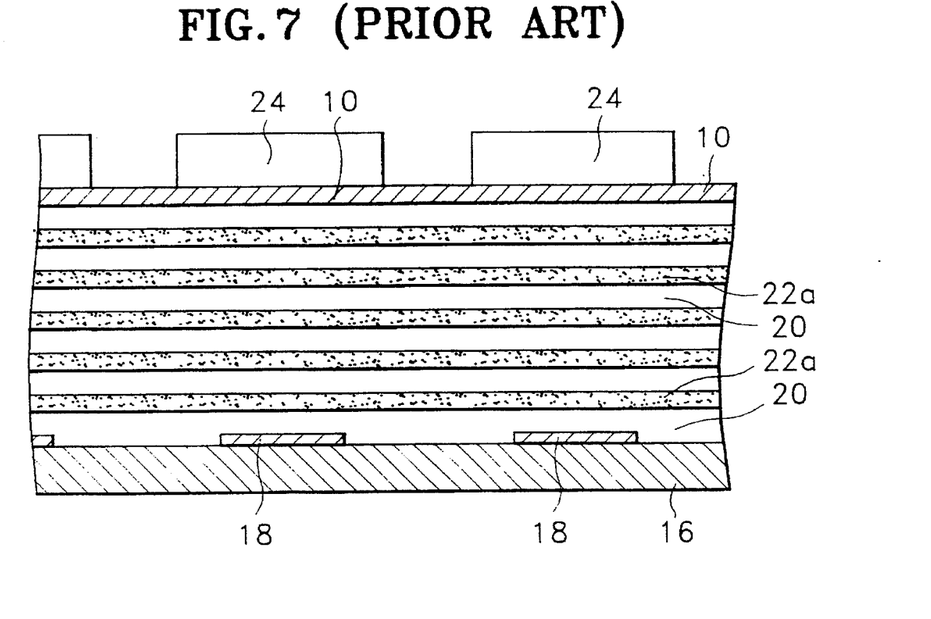

In FIG. 7, a photo mask pattern is formed on the surface of the uppermost epoxy resin layer, leaving a photoresist 24 as shown in FIG. 7.

The portion not covered by photoresist 24 is plasma-etched to form a hole for column 12. Then, the hole is filled with the epoxy resin. At the same time, the epoxy resin is coated on the exposed surface to form column 12 and surface epoxy resin layer 26. Thereafter, a shielding plate 11 is formed over each column 12.

Figure 8:
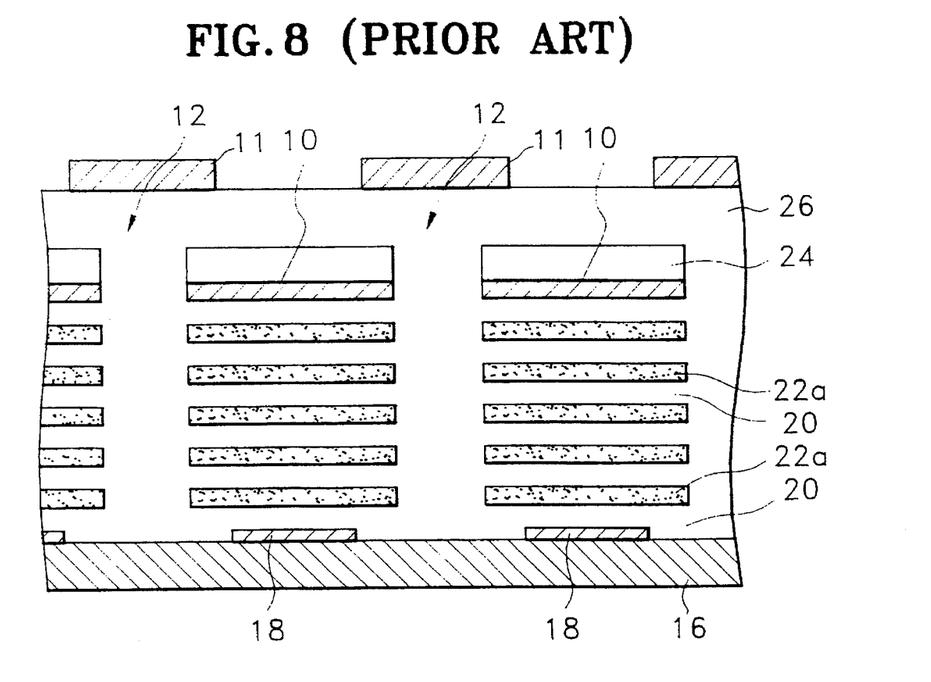

In FIG. 8, liquid crystal inlet holes 14 are formed by photo mask patterning and plasma etching. Thereafter, water, acetone or alcohol is injected via inlet hole 14 to thereby dissolve and remove each PVA layer 22a. Accordingly, inlet holes 14 and each portion 22b are left empty. Each epoxy resin layer 20 is supported by column 12 to sustain each liquid crystal layer portion space 22b.

Figure 9:
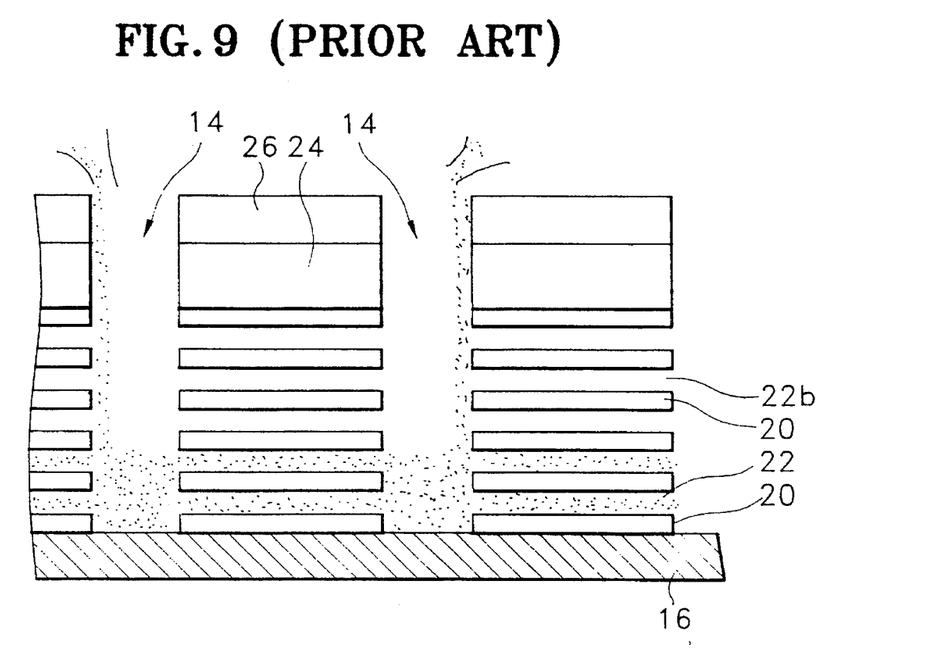
Figure 10:
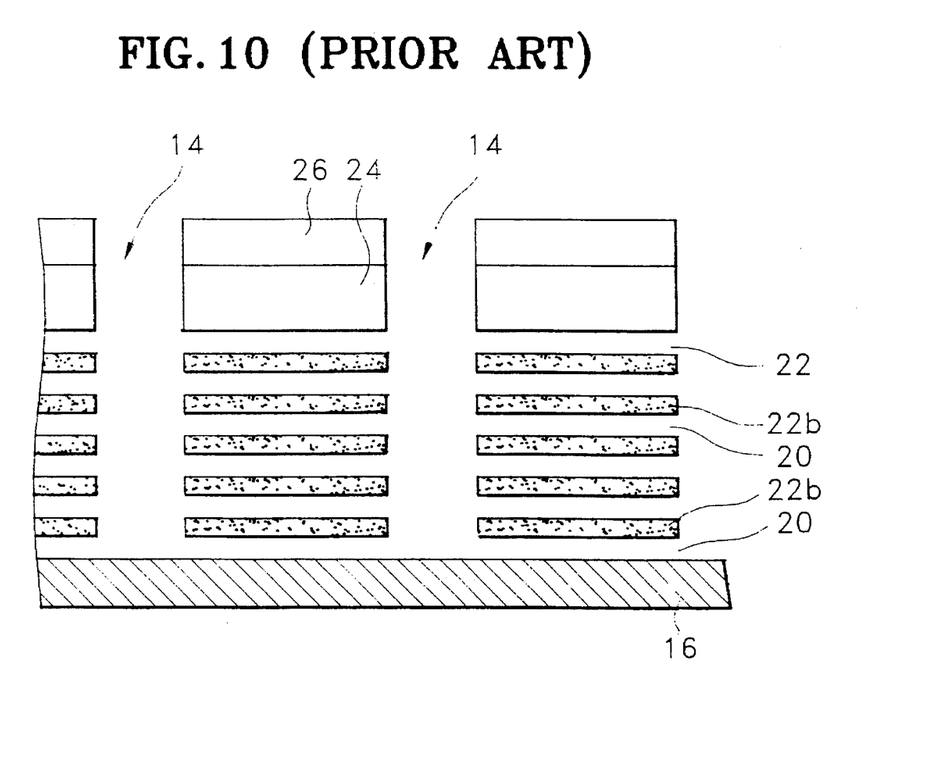

In FIG. 9, after the resultant structure is dried, liquid crystal is coated on the whole upper surface thereof under a vacuum to fill each inlet hole 14 and evacuated portion 22b to form a liquid crystal layers 22. Thereafter, as shown in FIG. 10, an epoxy resin is coated on the whole surface to seal the liquid crystal inlet hole 14, and shielding plate 11 is formed directly above each column 12 and inlet hole 14 which require the light to be shielded. Accordingly, the reflective-type LCD shown in FIGS. 1 through 4 results. It should be noted that the shielding plate is not shown in FIGS. 1 through 4.

In the above described manufacturing method, water-soluble PVA is used as a dissolution layer, and epoxy resin is used as an insulation layer. However, the materials employed here are not limited to these. For instance, it is suggested that a metal such as aluminum can be used instead of the water-soluble PVA, and that a metal oxide can be used instead of the epoxy resin. The drawbacks of this method are (1) that the dissolution of the dissolution layer cannot be completed in a short time and (2) a portion of the insulation layers and columns may be damaged during the dissolution process. However, the dissolution time cannot be reduced significantly. Furthermore, when the dissolution layer and the insulation layer are comprised of a metal and a resin, respectively, internal stresses are caused between the two materials because of the different thermal expansion ratios thereof, which can cause undesirable cracking.

SUMMARY OF THE INVENTION

It is an object of the present invention to provide a method of efficiently manufacturing a multi-layered structure that is used in a liquid crystal display device.

It is another object of the present invention to provide a method of manufacturing a liquid crystal display device in which the cavities for filling the liquid crystal can be formed in a short time and in which internal stresses can be minimized.

To accomplish the object of the present invention, there is provided a method of manufacturing a liquid crystal display device in which the multi-layered cavity for receiving the injected liquid crystal is obtained by repeatedly applying a sublimation material layer and then an insulating layer. Thereafter, the sublimation material layer is removed via heating, escaping through holes placed in the layered structure, leaving empty layered spaces into which liquid crystal can be filled.

Thus, a solvent is not needed, thereby avoiding undesired reduction to the insulating materials. Also, the present invention reduces the manufacturing time and provides excellent reproduceability, which thereby ensures a high quality LCD device.

DETAILED DESCRIPTION OF THE PREFERRED EMBODIMENT

FIGS. 11 through 19 show the manufacturing steps of the reflective type LCD according to the present embodiment.

Figure 11:
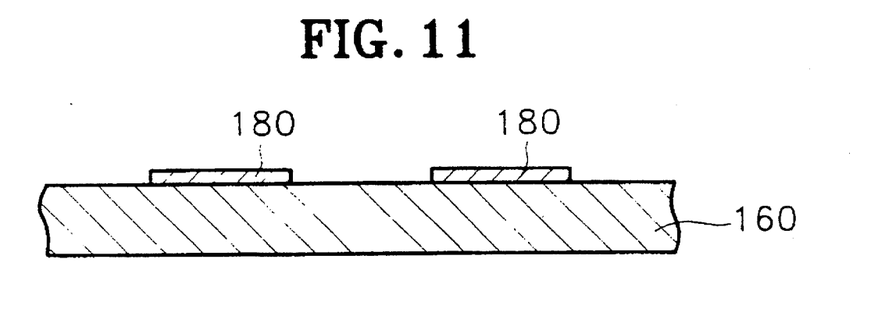
FIGS. 11, 12, 13, 14, 15, 16, 17, 18, 19 are views showing the manufacturing steps of the reflective type LCD according to the present inventions.

Referring to FIG. 11, a plurality of first electrodes 180 are formed of a conductive material such as ITO on a black plastic substrate 160 by a predetermined pattern, for example, a plurality of first electrodes 180 are formed as parallel stripes.

Figure 12:
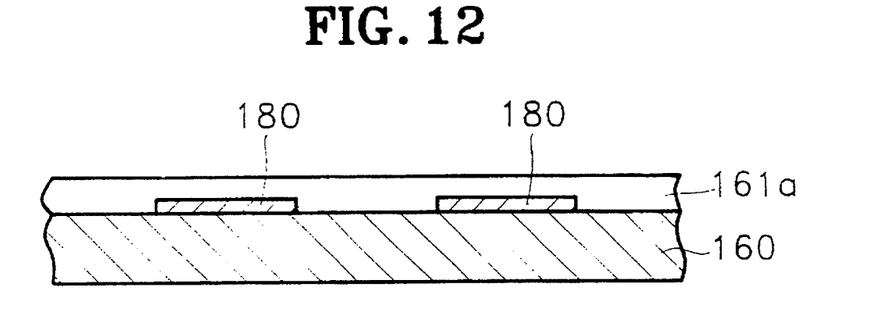

Thereafter, referring to FIG. 12, a light-transmitting electrode protective insulating resin layer 161a, is formed to a thickness of about 3,000 through 5,000 Å on the entire upper surface of substrate 160 on which the plurality of first electrodes 180 are formed.

Figure 13:
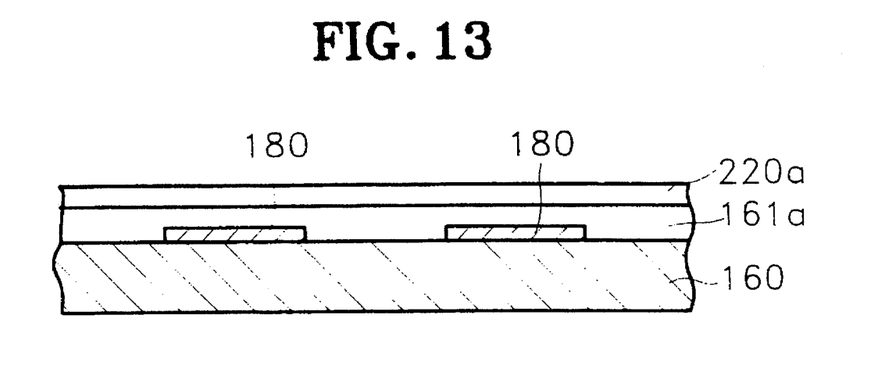
Figure 14:
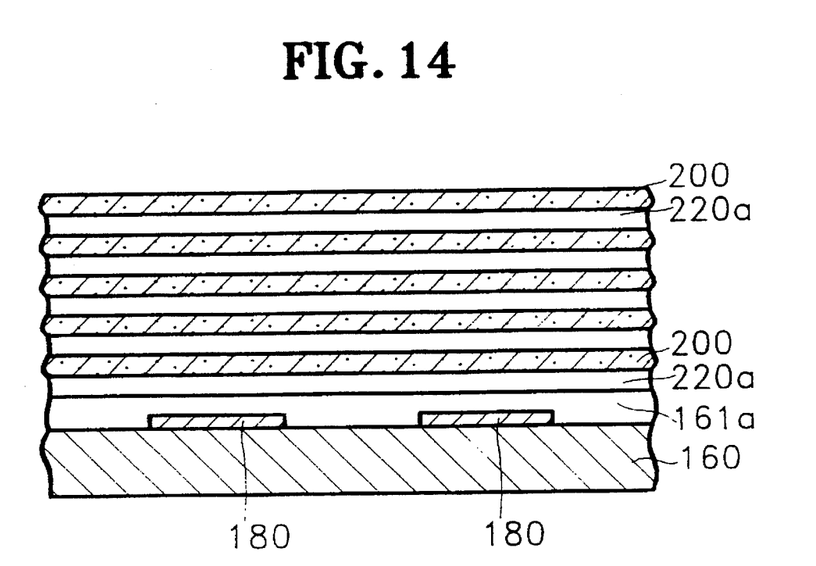

Next, referring to FIG. 13, a medium layer 220a comprised of sublimation material is formed to a thickness of 500 Å–5,000 Å on the surface of electrode protective layer 161a. Here, 1,5-dinitronaphtalene ($C_{10}H_6(NO_2)_2$), fumaric acid (HOOCCH=CHCOOH) or L-glutamic acid is preferably and selectively used for the medium layer.

Thereafter, referring to FIG. 14, the processes shown and described above with reference to FIGS. 13 and 14 are repeated, for instance four times to form a five-fold multilayer structure comprised of medium layer 220a and insulation layer 200.

Figure 15:
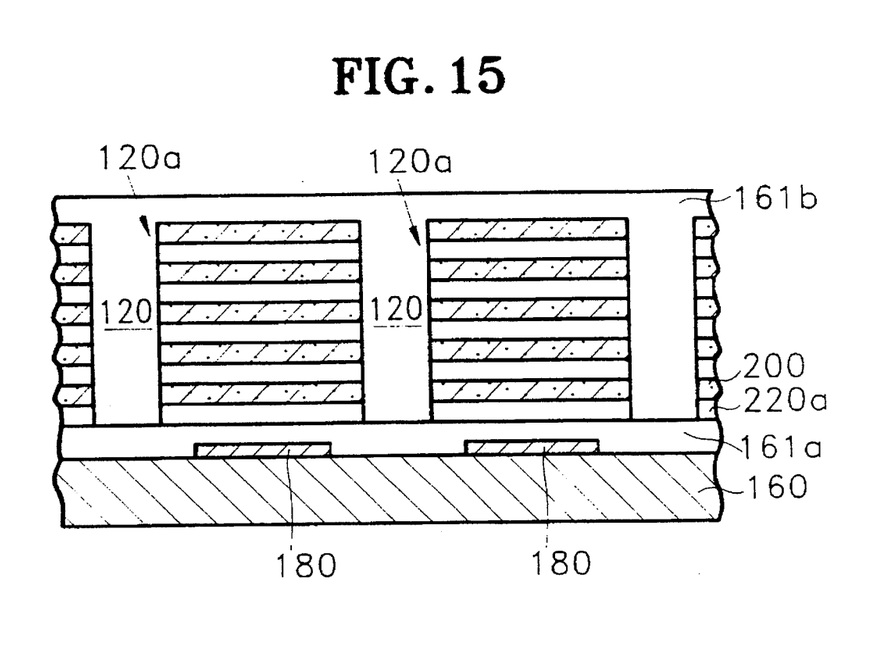

Subsequently, referring to FIG. 15, a plurality of first holes 120a for installing the columns therein are formed on the laminated structure previously formed. The first holes 120a are formed by applying a dry etching method using a gas of $CCl_4$, $BCl_3$, $CF_4$ or $SF_6$ after a photoresist pattern for the first hole is provided on the surface of the multi-layer. Thereafter, the photoresist, being temporarily formed to obtain the first holes, is removed. An electrically insulating resin material is then filled into the plurality of first holes 120a, to form a plurality of columns 120 and simultaneously coat the surface of the multi-layer structure with the electrically insulating resin material, thereby forming a light-transmitting resin layer 161b for protecting a subsequently formed second electrode.

Figure 16:
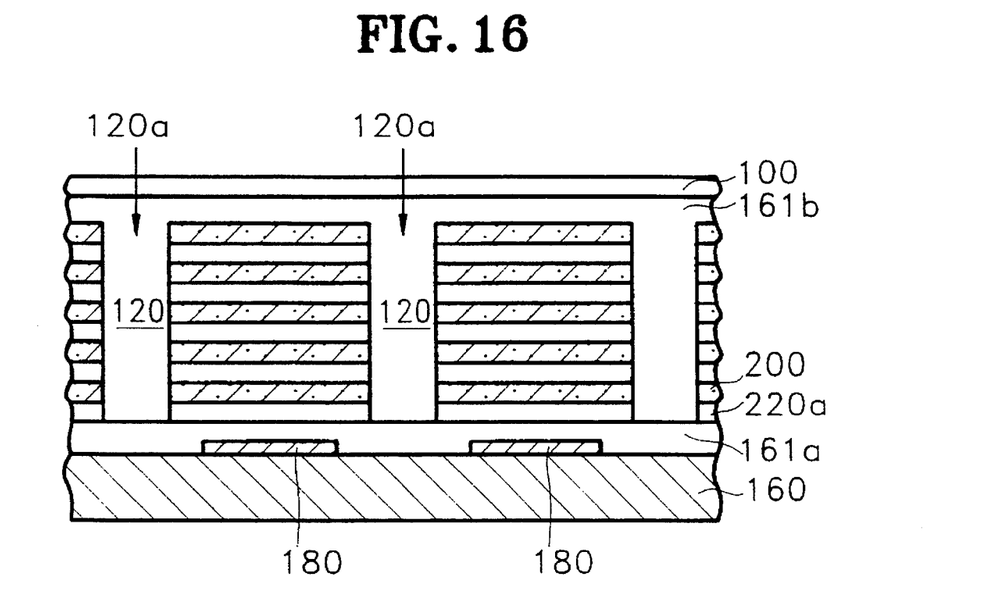

After formation of the resin layer 161b, referring to FIG. 16, a material such as ITO is deposited on the upper surface of resin layer 161b to form second electrode material layer 100.

Figure 17:
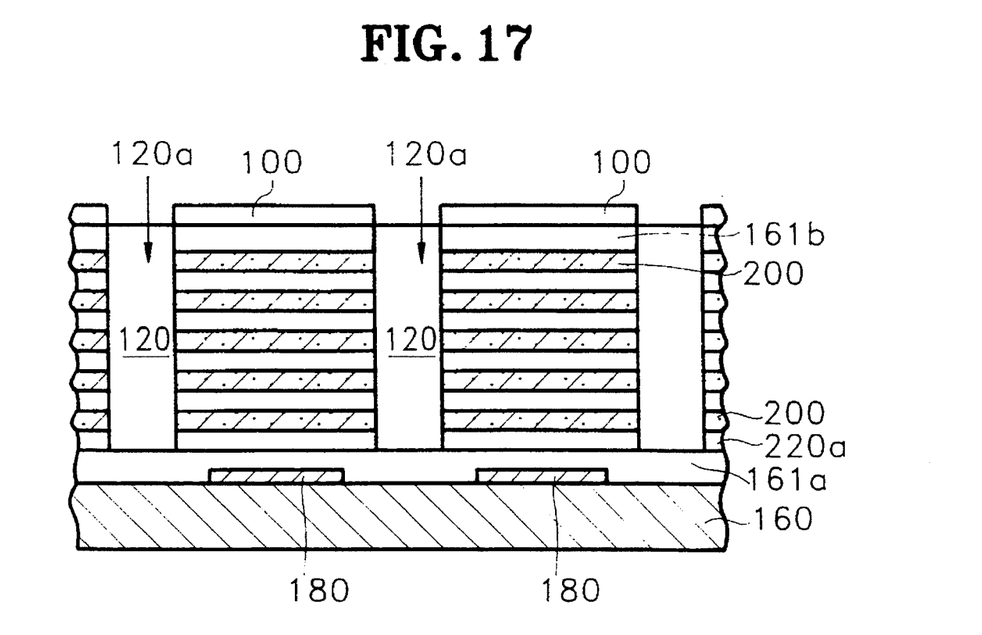

Thereafter, referring to FIG. 17, a plurality of second electrodes 100 corresponding in position to each of first electrodes 180 are formed on the upper surface of resin layer 161b by a predetermined pattern, for example, parallel stripes.

Figure 18:
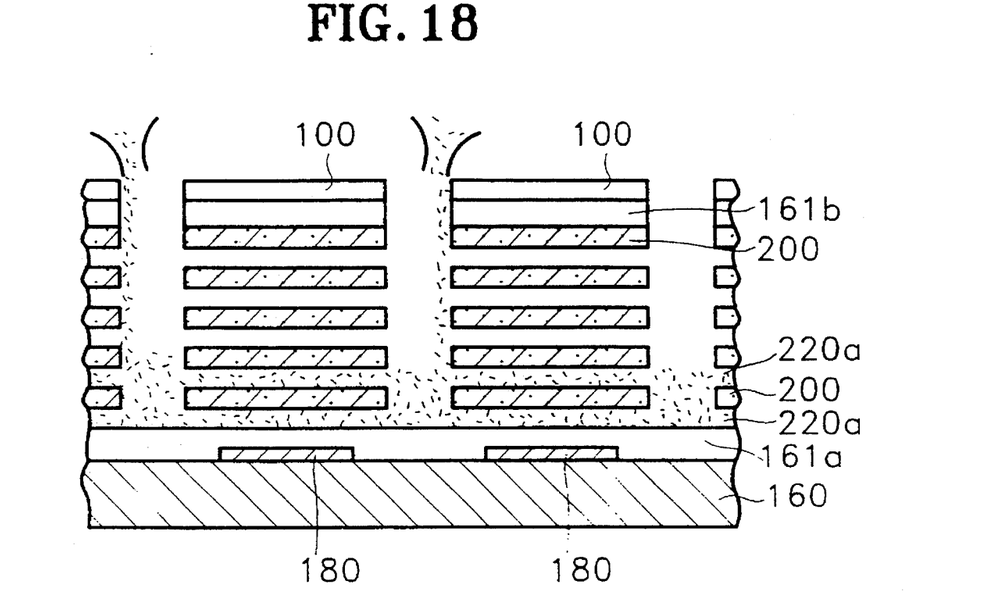

Thereafter, referring to FIG. 18, a plurality of inlet holes for injecting the liquid crystal into the multi-layer structure are formed. A photoresist is applied on the surfaces of second electrodes 100 and protective film 161b exposed between the second electrodes 100 and is exposed to form a photoresist pattern for the partial etching. The pattern for the etching should avoid the portion under which the columns have been previously formed. Also, it is desirable that the pattern for the etching is provided on the portion under which the second electrode is not provided. In this state, the portion exposed by the pattern is etched by the dry etching method using a gas of $CF_4+O_2$ for etching protective film 161b comprised of an organic resin of the upper surface portion, and by the dry etching method using a gas of $CCl_4$ or $BCl_3$ for etching layered portion below. After the inlet holes are etched, the photoresist is removed.

Afterwards, medium layer 220a is heated and sublimated and, being vaporized, is removed through the inlet holes, thus providing a plurality of cavities for filling the liquid crystal therein.

Then, the LCD device manufactured through the above processes is placed in a vacuum chamber. Thereafter, a proper amount of a liquid crystal is coated on the upper surface of the inlet holes. By raising the pressure of the vacuum to the atmospheric pressure, the liquid crystal fills into the empty space layered portions, which are partitioned by the insulation layers.

Figure 19:
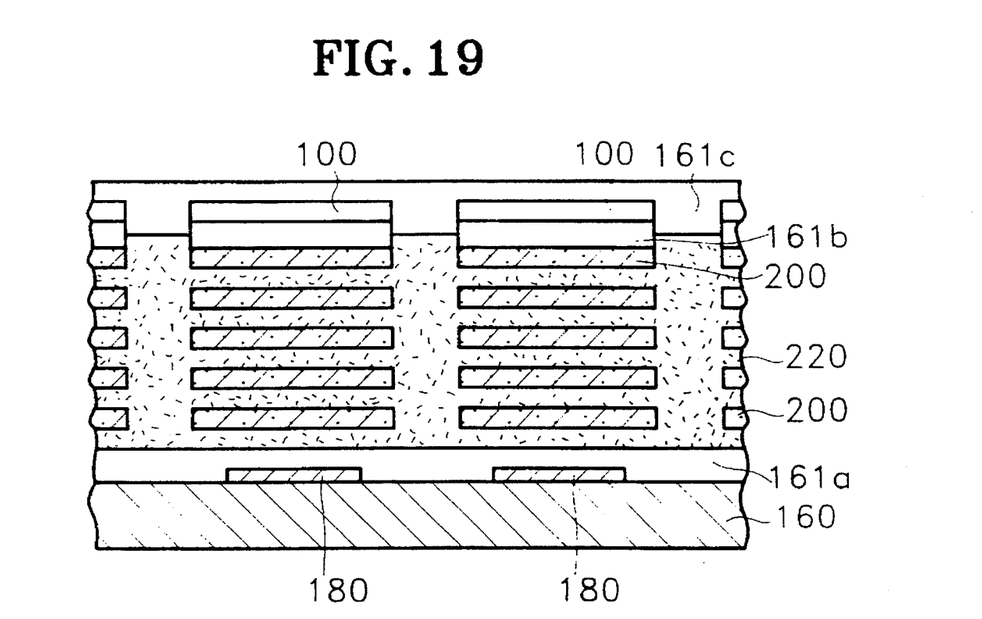

Subsequently, referring to FIG. 19, after the injection of liquid crystal is completed, the inlet hole is sealed with a polymerized resin. At the same time, second electrode 100 is coated to form a protective film 161c.

While the invention has been described in connection with what is presently considered to be the most practical and preferred embodiments, it is understood that the invention is not limited to the disclosed embodiment, but, on the contrary, is intended to cover various modifications and equivalent arrangements included within the spirit and scope of the appended claims.

What is claimed is:

1. A method of manufacturing a multi-layer portion of a liquid crystal display device into which a liquid crystal is deposited, said multi-layered portion formed over a substrate containing an electrode, over which is disposed a protective layer, comprising the steps of:

depositing a sublimation material layer on said protective layer;

depositing an insulation layer over said sublimation material layer;

alternatingly repeating said sublimation material layer depositing step and said insulation layer depositing step to thereby obtain a layered structure containing a plurality of sublimation material layers and a plurality of insulation layers;

forming a plurality of holes in said layered structure;

depositing an insulating material into said plurality of holes to form a plurality of supports;

forming a plurality of liquid crystal inlet holes in said layered structure where said supports are not positioned; and sublimating said plurality of sublimation material layers with heat to form spaces between said plurality of insulation layers into which a liquid crystal is deposited.

2. A multi-layer portion manufacturing method according to claim 1, wherein said sublimation material layer depositing step uses a sublimation material selected from the group consisting of 1,5-dinitronaphthalene ($C_{10}H_6(NO_2)_2$), fumaric acid (HOOCCH=CHCOOH) and L-glutamic acid.

3. A multi-layer portion manufacturing method according to claim 1, wherein said sublimation material layer depositing step includes forming a sublimation material layer to a thickness of about 500–5,000 Å.

4. A multi-layer portion manufacturing method according to claim 3, wherein said insulating layer depositing step includes forming an insulation layer to a thickness of about 500–5,000 Å.

5. A multi-layer portion manufacturing method according to claim 2, wherein said sublimation material layer depositing step includes forming a sublimation material layer to a thickness of about 500–5,000 Å.

6. A multi-layer portion manufacturing method according to claim 5 wherein said insulating layer depositing step includes forming an insulation layer to a thickness of about 3,000–5,000 Å.

7. A method of manufacturing a liquid crystal display device comprising the steps of:

forming a plurality of spaced first electrodes on a substrate;

depositing a light-transmitting protective layer over said plurality of spaced first electrodes;

depositing a sublimation material layer on said protective layer;

depositing an insulation layer over said sublimation material layer;

alternatingly repeating said sublimation material layer depositing step and said insulation layer depositing step to thereby obtain a layered structure containing a plurality of sublimation material layers and a plurality of insulation layers;

forming a plurality of second electrodes over an uppermost portion of said layered structure, including a step of substantially aligning each said second electrode with a respective one of said plurality of spaced first electrodes;

forming a plurality of holes in said layered structure;

depositing an insulating material into said plurality of holes to form a plurality of supports;

sublimating said plurality of sublimation material layers with heat to thereby form spaces between said plurality of insulation layers;

filling said spaces between said plurality of insulation layers with a liquid crystal; and depositing a light-transmitting outer protective layer over at least a portion of said liquid crystal and said second electrodes.

8. A liquid crystal manufacturing method according to claim 7, further including the step of:

forming a plurality of holes in said layered structure in positions other than those occupied by said plurality of supports; and heat treating said layered structure to cause said plurality of sublimation material layers to sublimate through said plurality of holes.

9. A multi-layer portion manufacturing method according to claim 8, wherein said sublimation material layer depositing step uses a sublimation material selected from the group consisting of 1,5-dinitronaphthalene ($C_{10}H_6(NO_2)_2$), fumaric acid (HOOCCH=CHCOOH) and L-glutamic acid.

10. A multi-layer portion manufacturing method according to claim 8, wherein said sublimation material layer depositing step includes forming a sublimation material layer to a thickness of about 500–5,000 Å.

11. A multi-layer portion manufacturing method according to claim 10 wherein said insulating layer depositing step includes forming an insulation layer to a thickness of about 3,000–5,000 Å.

12. A multi-layer portion manufacturing method according to claim 9, wherein said sublimation material depositing step includes forming a sublimation material layer to a thickness of about 500–5,000 Å.

13. A multi-layer portion manufacturing method according to claim 12, wherein said insulating layer depositing step includes forming an insulation layer to a thickness of about 3,000–5,000 Å.

* * * * *